(12) United States Patent
Lin (10) Patent No.: US 6,443,795 B1
(45) Date of Patent: Sep. 3, 2002

(54) TRANSMISSION CHAIN FOR TOYS

(76) Inventor: Wen-Pin Lin, No. 30, Chien-Yung St., Tung Dist., Taichung City (TW)

( * ) Notice: Subject to any disclaimer, the term of this patent is extended or adjusted under 35 U.S.C. 154(b) by 0 days.

(21) Appl. No.: 09/951,296

(22) Filed: Sep. 11, 2001

(51) Int. Cl.[7] .............................................. A63H 33/04
(52) U.S. Cl. ........................ 446/85; 446/102; 446/103; 446/104; 446/120; 474/156; 474/207; 474/231; 474/232; 474/233; 403/103
(58) Field of Search ........................ 446/85, 102, 103, 446/104, 120; 403/103; 474/156, 207, 232, 233, 231

(56) References Cited

U.S. PATENT DOCUMENTS 3,628,834 A * 12/1971 Anderson
4,882,901 A * 11/1989 Lapeyre
6,287,229 B2 * 9/2001 Reber

* cited by examiner

Primary Examiner—Derris H. Banks
Assistant Examiner—Ali Abdelwahed
(74) Attorney, Agent, or Firm—Trop, Pruner & Hu, P.C.

(57) ABSTRACT

A transmission chain includes a plurality of unitary chain links, each of which has parallel first and second side plates, first and second connecting pins, first and second pivot pins, and first and second pivot seats. The first and second pivot pins of one of the chain links are connected pivotally, removably and respectively to the first and second pivot seats of an adjacent one of the chain links, so as to enable the transmission chain to possess the characteristics of an adjustable chain length.

4 Claims, 9 Drawing Sheets

TRANSMISSION CHAIN FOR TOYS

BACKGROUND OF THE INVENTION

1. Field of the Invention

The invention relates to a transmission chain for toys, more particularly to a length-adjustable transmission chain.

2. Description of the Related Art

Figure 1:
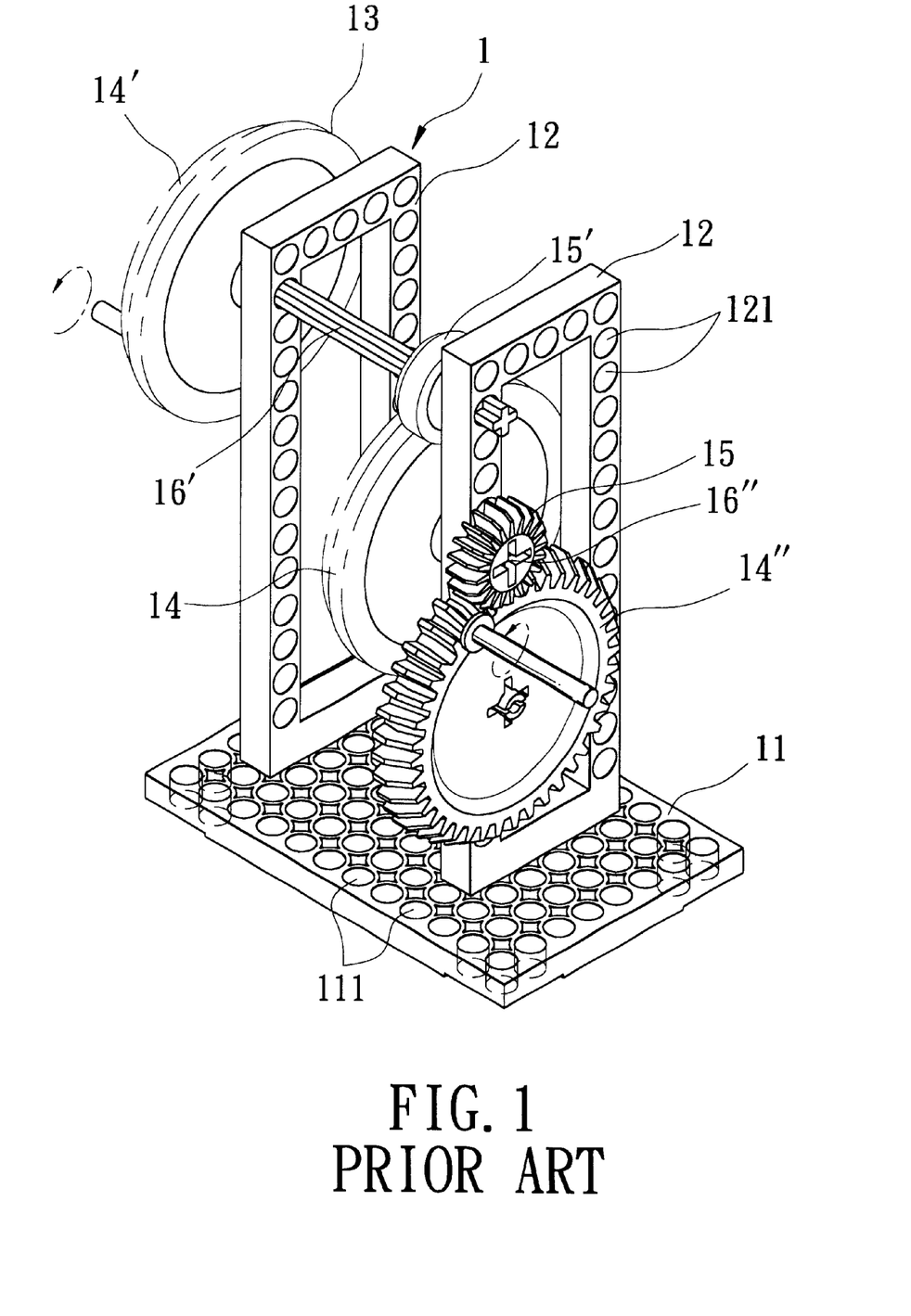
FIG. 1 is a perspective view of a conventional toy with a gear transmission assembly.

Referring to FIG. 1, a conventional toy 1 with a gear transmission assembly 13 is shown to comprise a base building block 11 with an array of connecting holes 111, two supporting building blocks 12 spaced apart from each other and mounted removably on a top surface of the base building block 11 through the engagement between the connecting holes 111 in the base building block 11 and connecting posts (not shown) of the supporting building blocks 12, and a gear transmission assembly 13 provided removably on the supporting building blocks 12. The supporting building block 12 is formed with a plurality of holes 121 for mounting the connecting transmission shafts 16', 16" of the gear transmission assembly 13. The gear transmission assembly 13 includes a plurality of large-diameter gears 14, 14', 14" and a plurality of small-diameter gears 15, 15' mounted on the connecting transmission shafts 16', 16".

Since the aforesaid toy 1 with the gear transmission assembly 13 requires direct engagement between the adjacent gears 14, 14', 14", 15, 15', the spatial configuration thereof is limited.

Figure 2:
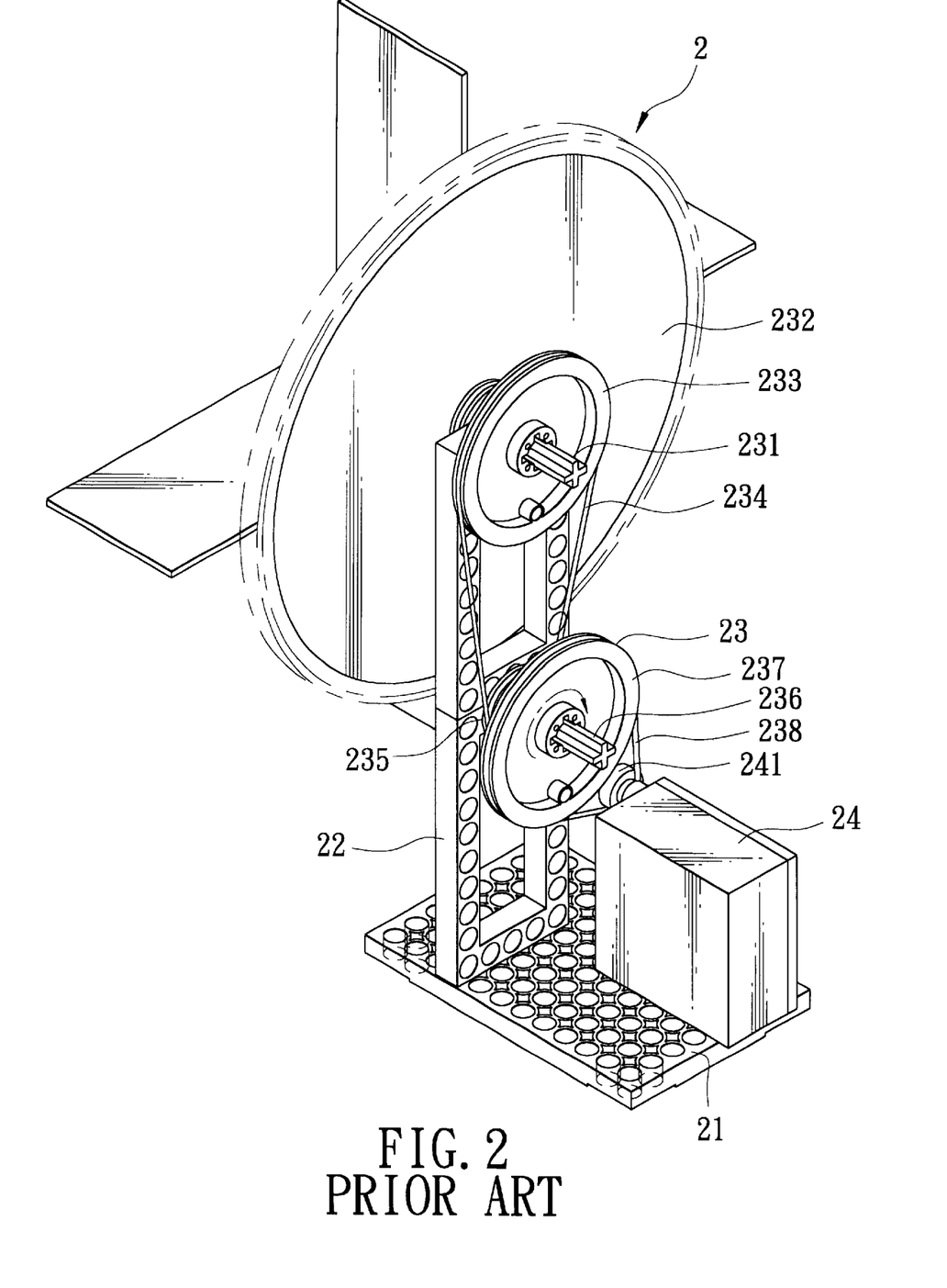
FIG. 2 is a perspective view of another conventional toy with a belt transmission assembly.

Referring to FIG. 2, another conventional toy 2 with a belt transmission assembly 23 is shown to comprise a base building block 21, two supporting building blocks 22 engaging removably each other and mounted removably on the base building block 21 in a manner similar to the toy 1 of FIG. 1, a belt transmission assembly 23 reomvably mounted on the supporting building blocks 22, and a drive assembly 24 mounted on the base building block 21. The drive assembly 24 provides power to drive the belt transmission assembly 23.

The belt transmission assembly 23 includes wheels 232, 233, 235, 237, connecting transmission shafts 231, 236, 241 and belts 234, 238. Although the wheels 232, 233, 235, 237, the connecting transmission shafts 231, 236, 241 and the belts 234, 238 cooperatively provide more diverse configurations as compared to the prior art shown in FIG. 1, since the lengths of the belts are specified in accordance with the sizes of the wheels and the distance therebetween, the diversity of the belt transmission assembly 23 is still restricted. Moreover, the belts 234, 238 used in the belt transmission assembly 23 are generally made of rubber, and are thus susceptible to elastic fatigue after a period of use.

SUMMARY OF THE INVENTION

Therefore, the object of the present invention is to provide a length-adjustable transmission chain that is suitable for training on different sizes of sprockets and that is clear of the aforesaid drawbacks of the prior art.

Accordingly, the transmission chain of this invention comprises a plurality of unitary chain links, each of which has parallel first and second side plates, first and second connecting pins, first and second pivot pins, and first and second pivot seats.

The first and second side plates extend in a first direction and are spaced apart from each other in a second direction transverse to the first direction. Each of the first and second side plates has a first end portion and a second end portion opposite to the first end portion in the first direction.

The first connecting pin extends in the second direction and is connected integrally to the first end portions of the first and second side plates. The second connecting pin extends in the second direction and is connected integrally to the second end portions of the first and second side plates.

The first and second pivot pins protrude in opposite directions from the first end portions of the first and second side plates, respectively. The first and second pivot seats are formed integrally and respectively on the second end portions of the first and second side plates.

The first and second pivot pins of one of the chain links are connected pivotally, removably and respectively to the first and second pivot seats of an adjacent one of the chain links.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
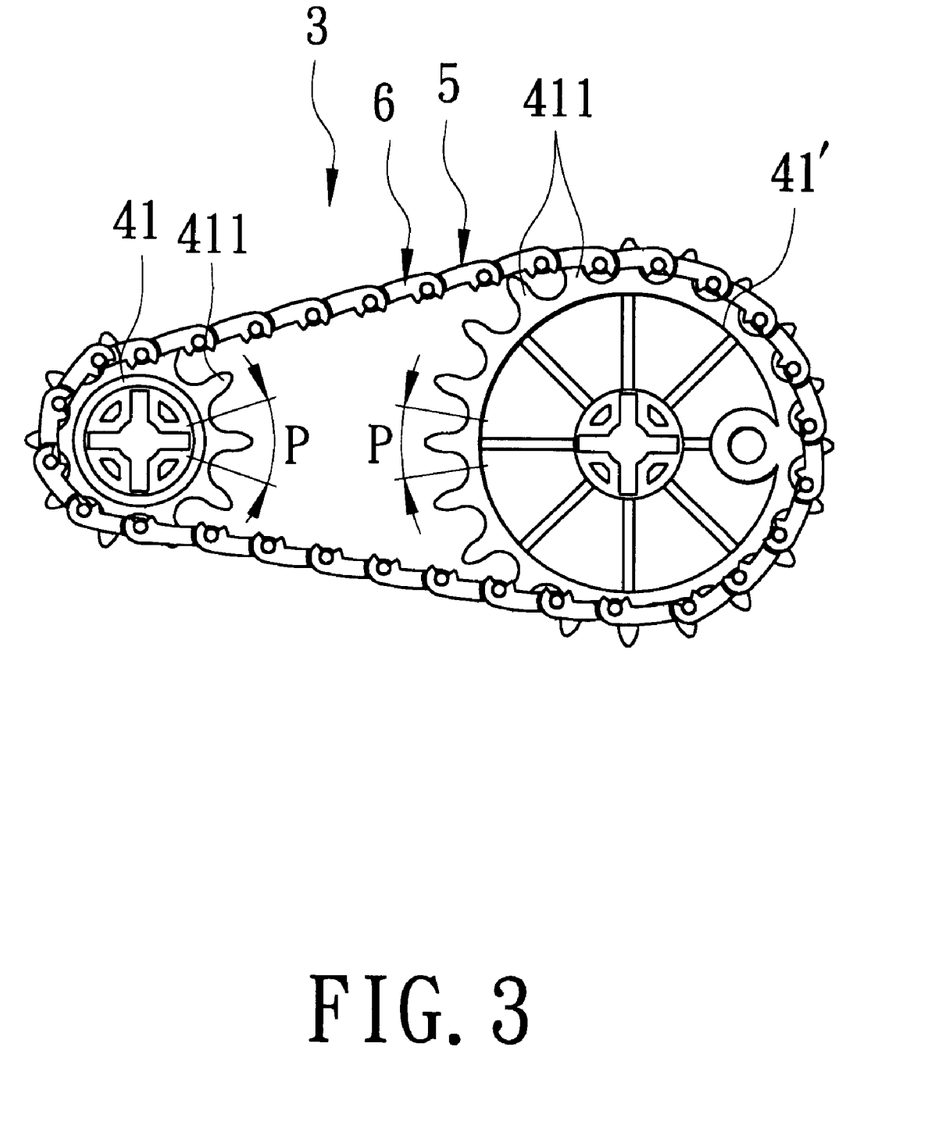
FIG. 3 is a schematic side view of the preferred embodiment of the transmission chain according to this invention when trained on a pair of sprockets.

Referring to FIG. 3, the preferred embodiment of a transmission chain 5 according to this invention is shown to be adapted to be trained on a pair of sprockets 41, 41'. Each of the sprockets 41, 41' has a plurality of teeth 411. The numbers of teeth on the sprockets 41, 41' differ from each other. The circular pitches (P) of the sprockets 41, 41' are identical to each other. In this preferred embodiment, P=6.35 mm.

Figure 4:
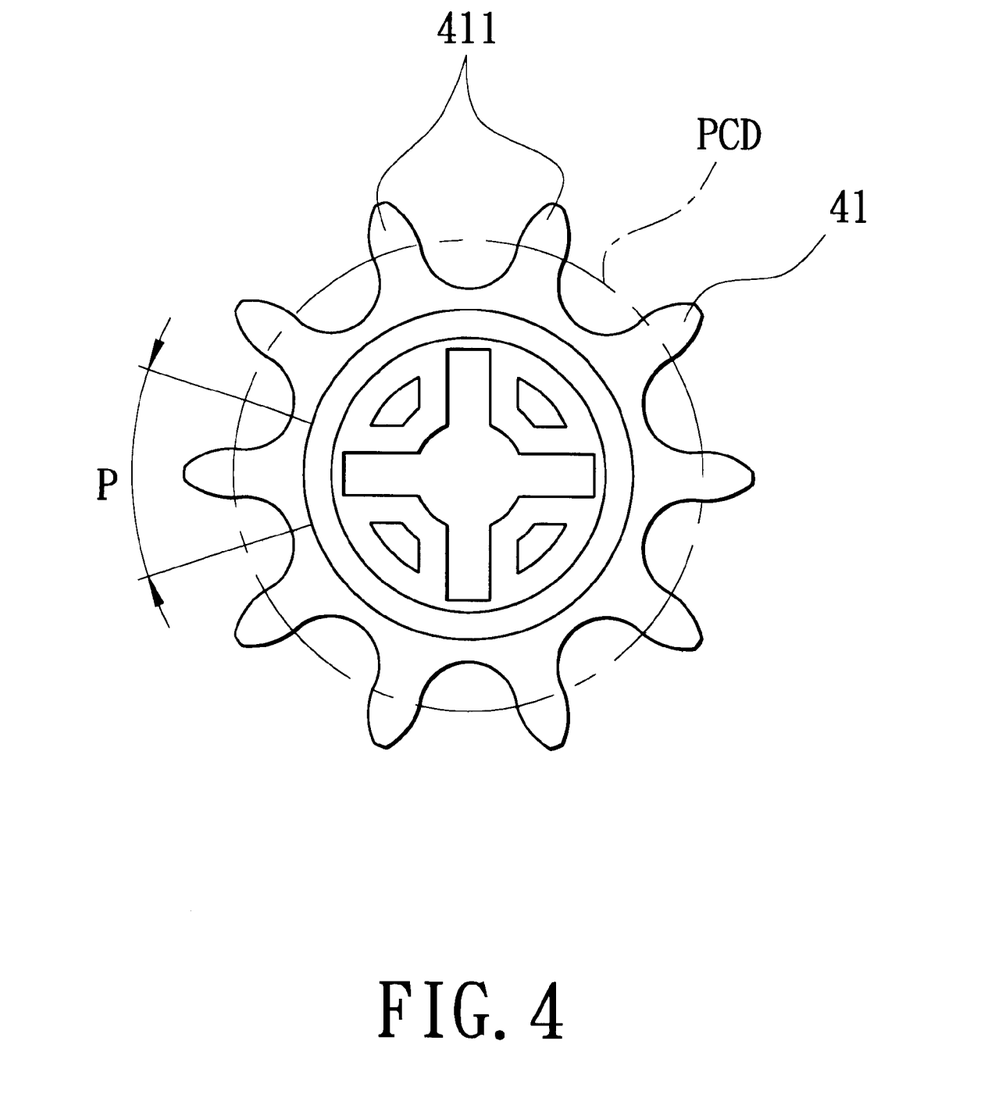
FIG. 4 is a side view of a sprocket with ten teeth.

Referring to FIG. 4, a sprocket 41 with ten teeth 411 is shown. According to a standard specification, the sprocket 41 with ten teeth 411 has a pitch circle diameter (PCD) of 20.55 mm. An arc length of the sprocket 41 can be calculated to be equal to 6.455 mm in accordance with the following formula:

$$\text{Arc length} = PCD \times \pi \times \text{teeth number (T)}.$$

Figure 4A:
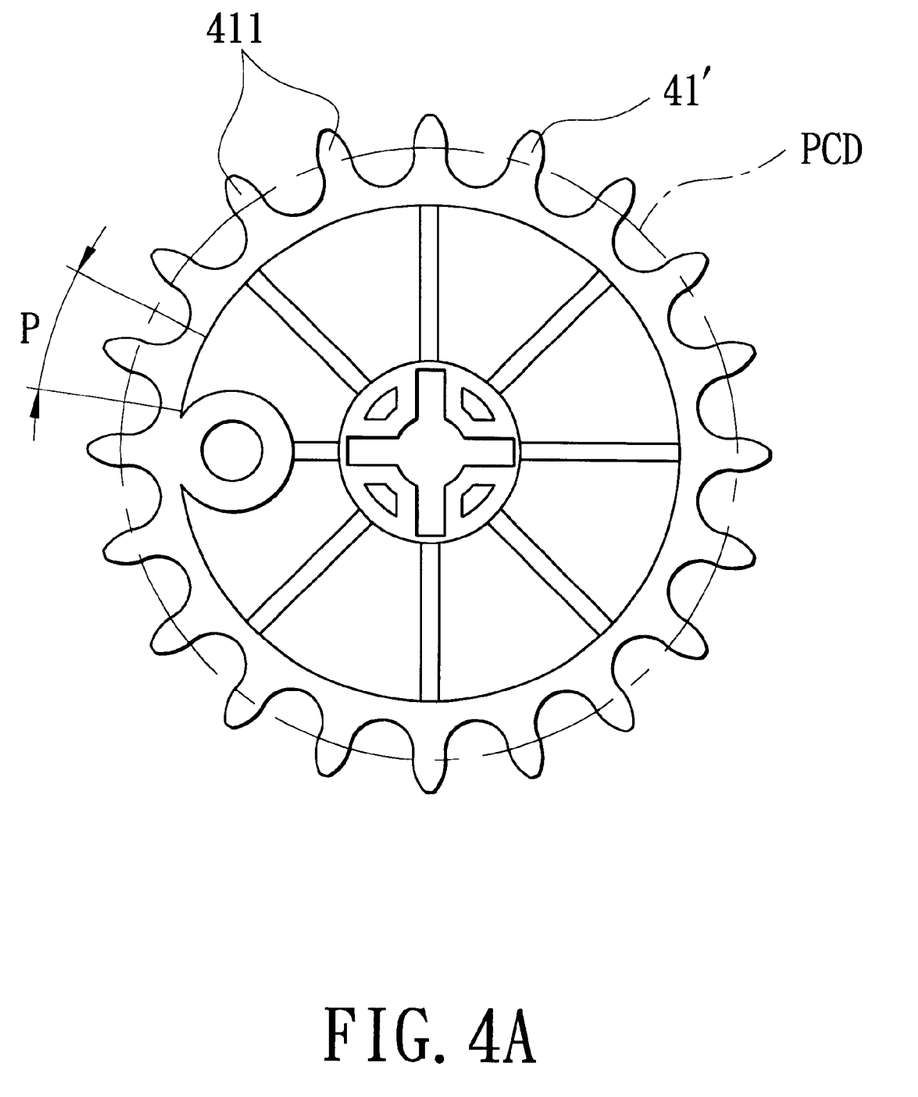
FIG. 4A is a side view of a sprocket with twenty teeth.
Figure 5:
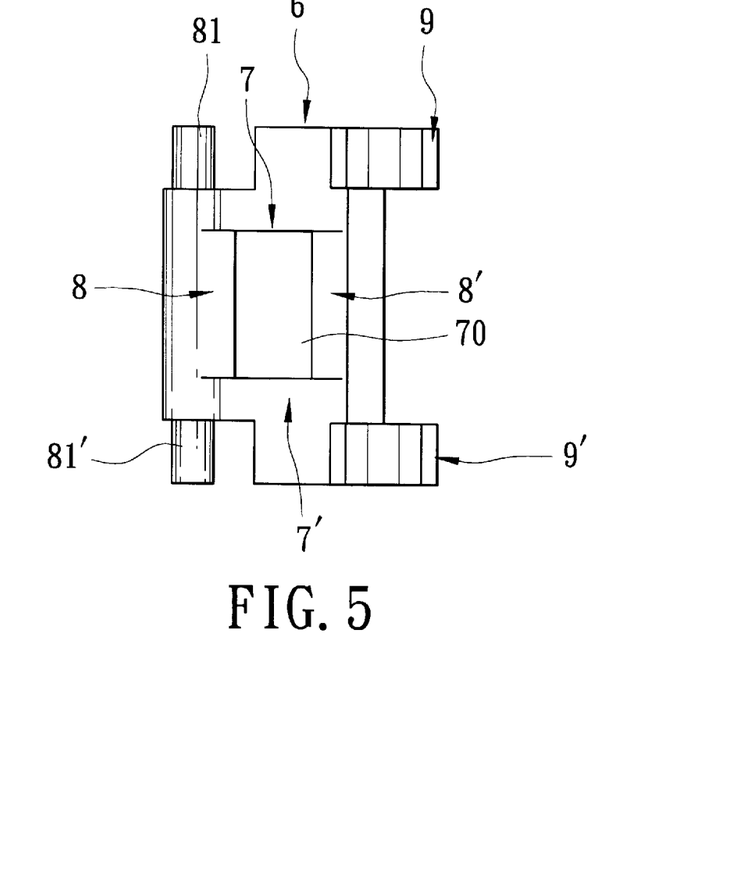
FIG. 5 is a top view of a unitary chain link of the transmission chain according to this invention.
Figure 5A:
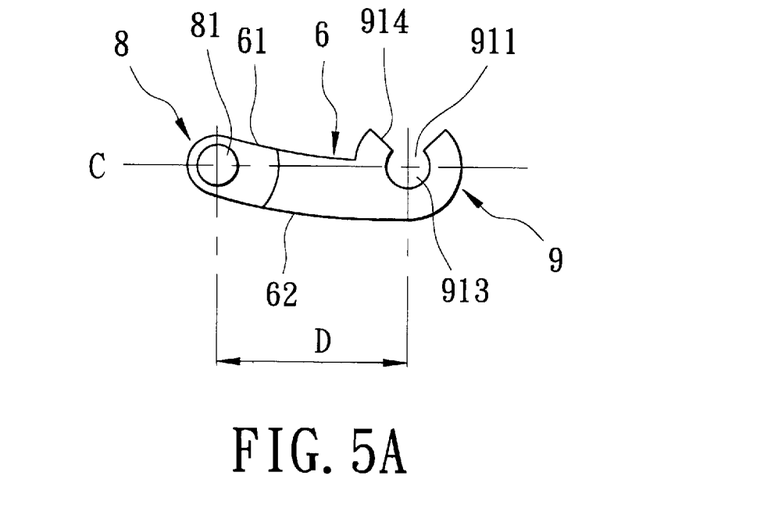
FIG. 5A is a side view of the unitary chain link of FIG. 5.
Figure 6:
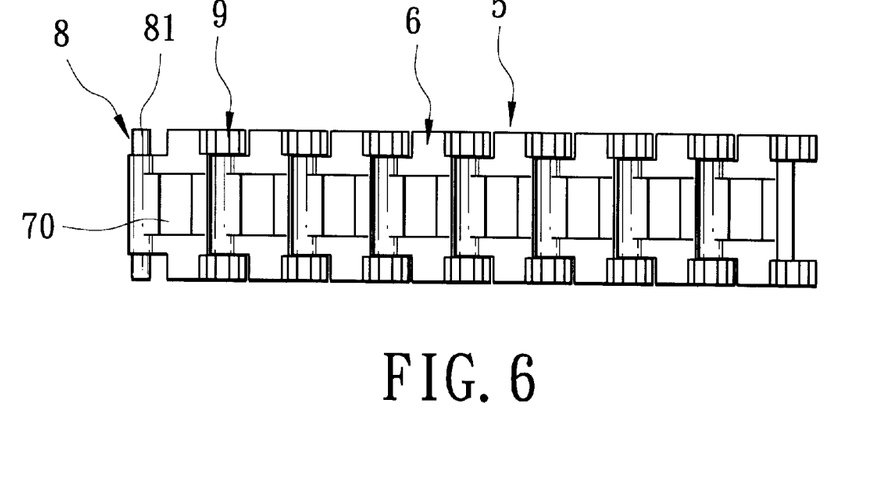
FIG. 6 is a top view of the preferred embodiment of the transmission chain according to this invention.
Figure 6A:
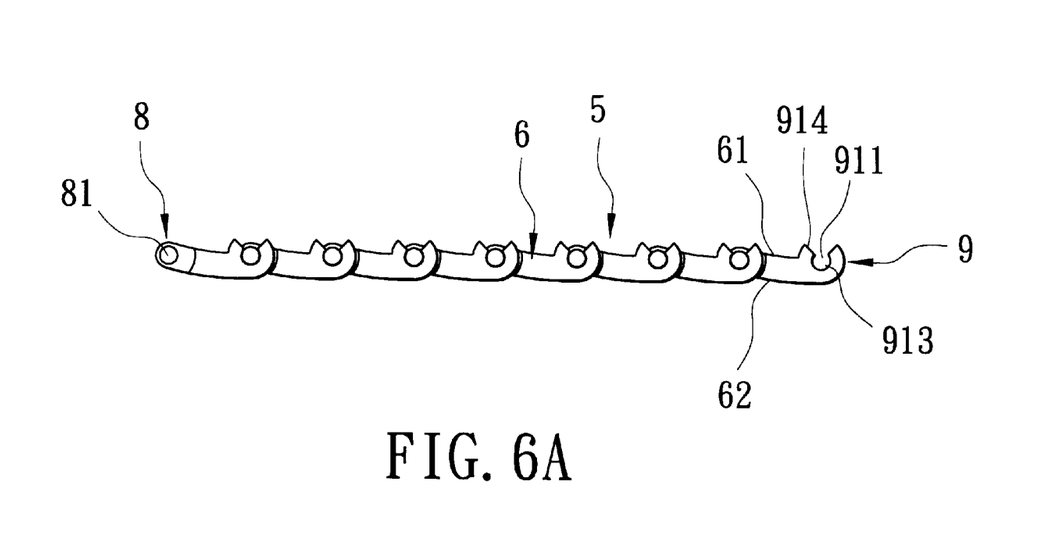
FIG. 6A is a side view of the transmission chain of FIG. 6.

Referring to FIG. 4A, a sprocket 41' with twenty teeth 411 is shown. According to the standard specification, the sprocket 41' with twenty teeth 411 has a pitch circle diameter (PCD) of 40.59 mm. An arc length of the sprocket 41' can be calculated to be equal to 6.376 mm in accordance with the aforementioned formula. Similarly, an arc length of a sprocket with thirty teeth and PCD of 60.75 mm can be calculated to be equal to 6.361 mm in accordance with the aforementioned formula. In view of the aforesaid, the greater the teeth number of the sprocket 41, 41', the smaller will be the arc length.

Referring to FIGS. 5, 5A, 6 and 6A, the preferred embodiment of the transmission chain 5 according to the invention is shown to comprise a plurality of unitary chain links 6, each of which has parallel first and second side plates 7, 7', first and second connecting pins 8, 8', first and second pivot pins 81, 81', and first and second pivot seats 9, 9'. The first and second side plates 7, 7' and the first and second connecting pins 8, 8' of each of the chain links 6 cooperate to form a tooth engaging opening 70 for engaging the teeth of the sprockets. Each of the chain links 6 is formed integrally from plastic.

The first and second side plates 7, 7' extend in a first direction and are spaced apart from each other in a second direction transverse to the first direction. Each of the first and second side plates 7, 7' has a first end portion and a second end portion opposite to the first end portion in the first direction. Moreover, each of the first and second side plates 7, 7' has a curved first longitudinal edge 61 that curves toward a longitudinal axis (C), and a curved second longitudinal edge 62 opposite to the first longitudinal edge 61.

The first connecting pin 8 extends in the second direction and is connected integrally to the first end portions of the first and second side plates 7, 7'. The second connecting pin 8' extends in the second direction and is connected integrally to the second end portions of the first and second side plates 7, 7'. The first and second pivot pins 81, 81' protrude in opposite directions from the first end portions of the first and second side plates 7, 7', respectively. Moreover, the first and second pivot pins 81, 81' of each of the chain links 6 are aligned with each other along a first axis.

The first and second pivot seats 9, 9' are formed integrally and respectively on the second end portions of the first and second side plates 7, 7'. Each of the first and second pivot seats 9, 9' of each of the chain links 6 is formed a pivot hole 913 and a notch 911 for access into the pivot hole 913. The pivot holes 913 in the first and second pivot seats 9, 9' of each of the chain links 6 are aligned with each other along a second axis. The notch 911 in each of the first and second pivot seats 9, 9' opens in a direction away from the second longitudinal edges 62 toward the sprocket and diverges in a radial outward direction relative to the second axis.

The first and second axes on each of the chain links 6 are spaced apart along the longitudinal axis (C) by a distance (D) equal to the circular pitch of the sprockets. The distance (D) in this preferred embodiment is equal to 6.35 mm.

The notch 911 in each of the first and second pivot seats 9, 9' is defined by confronting inclined end faces 914, each of which has a radial inner edge proximate to the second axis, and a radial outer edge distal to the second axis. The radial inner edges of the inclined end faces 914 are spaced apart by a first distance shorter than a diameter of the first and second pivot pins 81, 81'. The radial outer edges of the inclined end faces 914 are spaced apart by a second distance longer than the diameter of the first and second pivot pins 81, 81'.

Each of the first and second pivot pins 81, 81' of one of the chain links 6 is pivotally, removably and respectively disposed in the pivot holes 913 in the first and second pivot seats 9, 9' of the adjacent one of the chain links 6 via the notches 911 in the first and second pivot seats 9, 9', thereby aligning the first axis on one of the chain links 6 with the second axis on the adjacent one of the chain links 6. Therefore, the first and second pivot pins 81, 81' of one of the chain links 6 are connected pivotally, removably and respectively to the first and second pivot seats 9, 9' of an adjacent one of the chain links 6.

Figure 7:
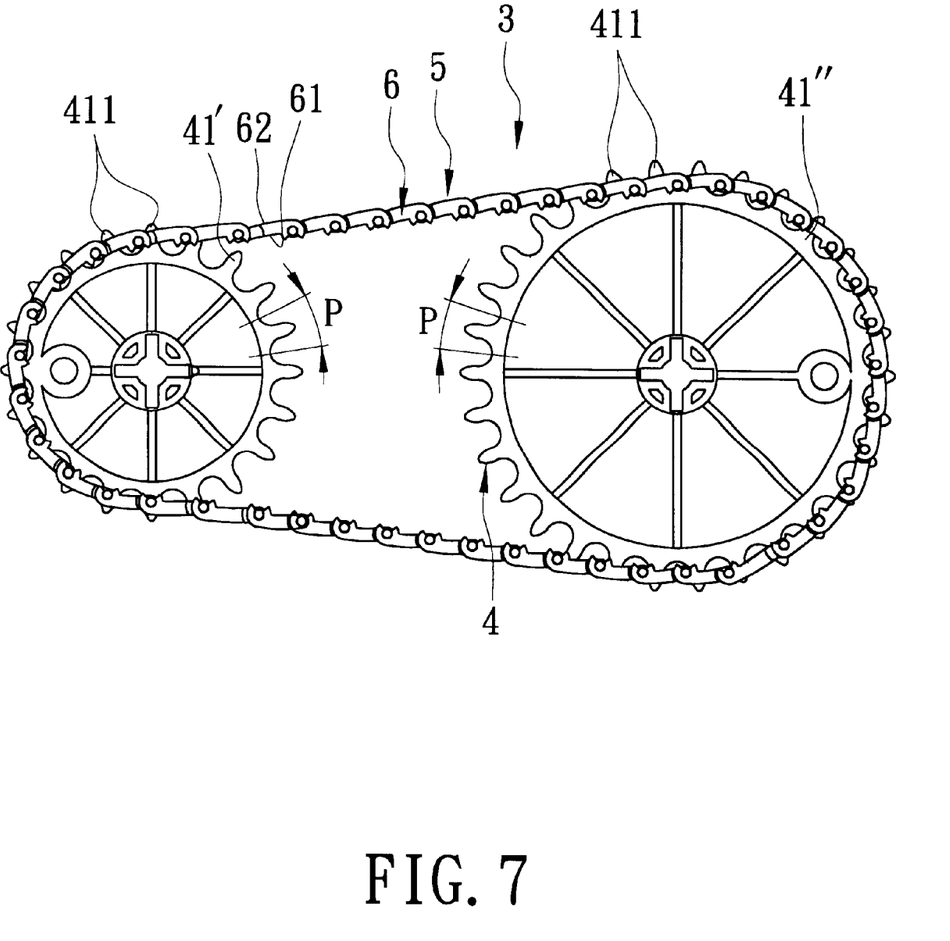
FIG. 7 is a side view of the transmission chain according to this invention when trained on a pair of sprockets having sizes different from those shown in FIG. 3.
Figure 8:
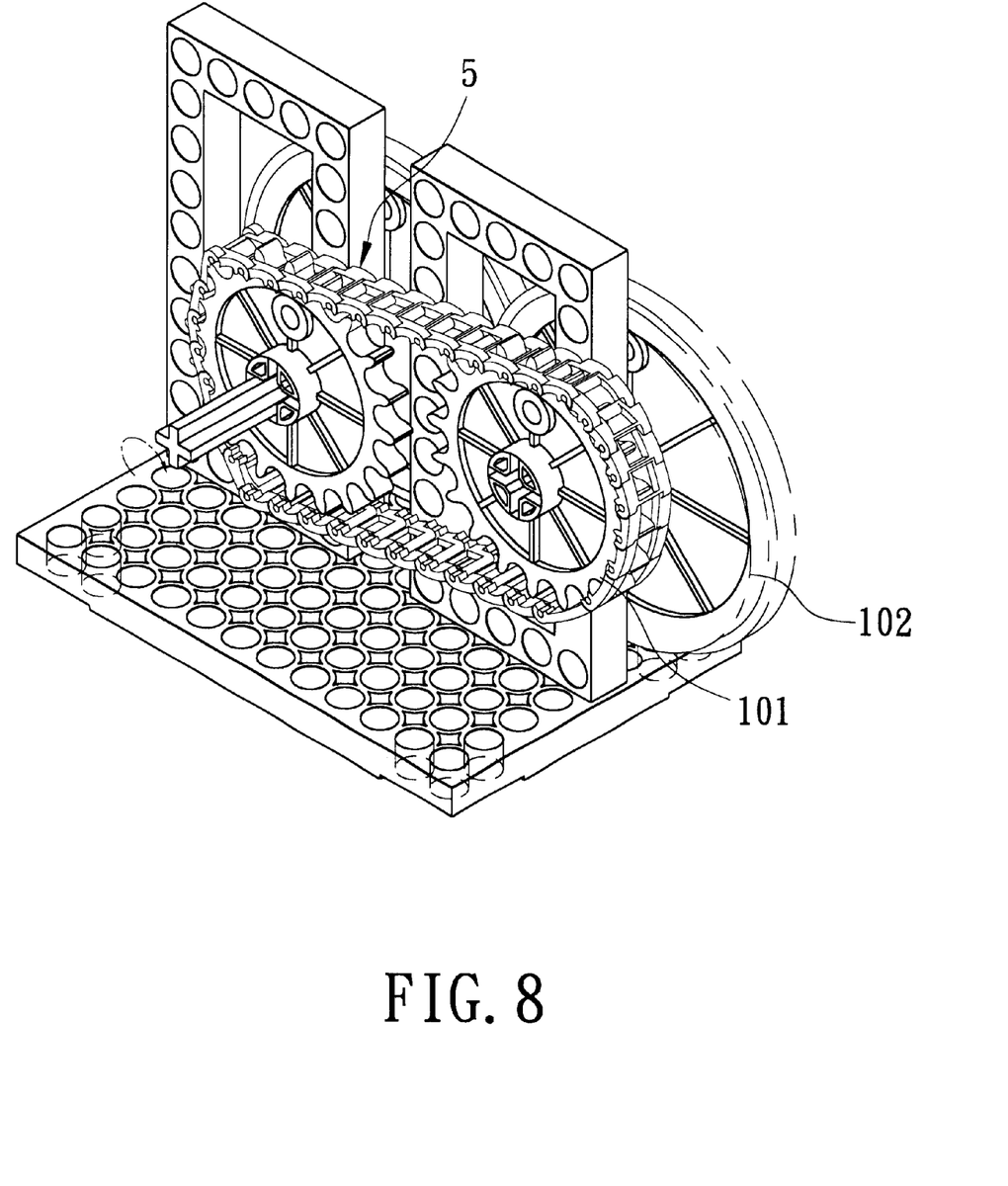
FIG. 8 is a perspective view of a toy which includes the transmission chain according to this invention.

In view of the aforesaid, since the first and second pivot pins 81, 81' of one of the chain links 6 are connected removably to the first and second pivot seats 9, 9' of an adjacent one of the chain links 6, the length of the transmission chain 5 can be adjusted in accordance with the number of teeth 411 on the sprockets 41, 41', 41", as shown in FIGS. 3 and 7. Referring to FIG. 8, moreover, diverse structural combinations between transmission chains 5 and sprockets 101, 102 can be created in view of the chain links 6 according to the invention. Moreover, since each of the chain links 6 is formed integrally from plastic, the transmission chain 5 constituted by the chain links 6 is less susceptible to deformation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A transmission chain adapted to be trained on a sprocket, said transmission chain comprising a plurality of unitary chain links, each of which has:

parallel first and second side plates extending in a first direction and spaced apart from each other in a second direction transverse to the first direction, each of said first and second side plates having a first end portion and a second end portion opposite to said first end portion in the first direction;

a first connecting pin extending in the second direction and connected integrally to said first end portion of each of said first and second side plates;

a second connecting pin extending in the second direction and connected integrally to said second end portion of each of said first and second side plates;

first and second pivot pins protruding in opposite directions from said first end portions of said first and second side plates, respectively;

a first pivot seat formed integrally on said second end portion of said first side plate; and a second pivot seat formed integrally on said second end portion of said second side plate;

said first and second pivot pins of one of said chain links being connected pivotally, removably and respectively to said first and second pivot seats of an adjacent one of said chain links;

said first and second pivot pins of each of said chain links being aligned with each other along a first axis;

each of said first and second pivot seats of each of said chain links having a pivot hole and a notch for access into said pivot hole, said pivot holes in said first and second pivot seats of each of said chain links being aligned with other other along a second axis;

each of said first and second pivot pins of said one of said chain links being pivotally, removably and respectively disposed in said pivot holes in said first and second pivot seats of the adjacent one of said chain links via said notches in said first and second pivot seats, thereby aligning said first axis on said one of said chain links with said second axis on the adjacent one of said chain links;

said notch in each of said first and second pivot seats diverging in a radial outward direction relative to said second axis, and being defined by confronting inclined end faces, each of which has a radial inner edge proximate to said second axis, and a radial outer edge distal to said second axis, said radial inner edge of said inclined end faces being spaced apart by a first distance shorter than a diameter of said first and second pivot pins, said radial outer edges of said inclined end faces being spaced apart by a second distance longer than the diameter of said first and second pivot pins.

2. The transmission chain of claim 1, wherein each of said chain links is formed integrally from plastic.

3. A transmission chain adapted to be trained on a sprocket, said transmission chain comprising a plurality of unitary chain links, each of which has:

parallel first and second side plates extending in a first direction and spaced apart from each other in a second direction transverse to the first direction, each of said first and second side plates having a first end portion and a second end portion opposite to said first end portion in the first direction;

a first connecting pin extending in the second direction and connected integrally to said first end portion of each of said first and second side plates;

a second connecting pin extending in the second direction and connected integrally to said second end portion of each of said first and second side plates;

first and second pivot pins protruding in opposite directions from said first end portions of said first and second side plates, respectively;

a first pivot seat formed integrally on said second end portion of said first side plate; and a second pivot seat formed integrally on said second end portion of said second side plate;

said first and second pivot pins of one of said chain links being connected pivotally, removably and respectively to said first and second pivot seats of an adjacent one of said chain links;

said first and second pivot pins of each of said chain links being aligned with each other along a first axis;

each of said first and second pivot seats of each of said chain links having a pivot hole and a notch for access into said pivot hole, said pivot holes in said first and second pivot seats of each of said chain links being aligned with other along a second axis;

each of said first and second pivot pins of said one of said chain links being pivotally, removably and respectively disposed in said pivot holes in said first and second pivot seats of the adjacent one of said chain links via said notches in said first and second pivot seats, thereby aligning said first axis on said one of said chain links with said second axis on the adjacent one of said chain links;

each of said first and second side plates having a curved first longitudinal edge that curves toward a longitudinal axis that is transverse to said first and second axes, and a curved second longitudinal edge that curves away from said longitudinal axis.

4. The transmission chain of claim 3, wherein said notch in each of said first and second pivot seats opens in a direction away from said second longitudinal edges of said first and second side plates.

* * * * *